US007190938B2

(12) United States Patent
Kaneko

(10) Patent No.: US 7,190,938 B2
(45) Date of Patent: Mar. 13, 2007

(54) BROADCAST RECEIVER

(75) Inventor: Shigeru Kaneko, Kanagawa (JP)

(73) Assignee: Sony Corporation (JP)

( * ) Notice: Subject to any disclaimer, the term of this patent is extended or adjusted under 35 U.S.C. 154(b) by 636 days.

(21) Appl. No.: 10/028,033

(22) Filed: Dec. 21, 2001

(65) Prior Publication Data

US 2002/0102954 A1 Aug. 1, 2002

(30) Foreign Application Priority Data

Dec. 26, 2000 (JP) .......................... P2000-394378

(51) Int. Cl.
*H04B 1/18* (2006.01)

(52) U.S. Cl. .............................. 455/186.1; 455/166.2; 370/486

(58) Field of Classification Search ............. 455/158.4, 455/158.5, 166.1, 131, 142, 185.1, 186.1, 455/45, 161.1, 166.2, 179.1; 370/480, 485, 370/486, 487, 493

See application file for complete search history.

(56) References Cited

U.S. PATENT DOCUMENTS

| | | | | |
|---|---|---|---|---|
| 5,457,815 | A * | 10/1995 | Morewitz, II | 455/161.1 |
| 5,802,066 | A * | 9/1998 | Miyake et al. | 370/527 |
| 6,038,434 | A * | 3/2000 | Miyake | 455/186.1 |
| 6,160,997 | A * | 12/2000 | Oberlaender | 455/557 |
| 6,161,002 | A * | 12/2000 | Migliaccio et al. | 455/150.1 |
| 6,173,165 | B1 * | 1/2001 | Ruhl et al. | 455/186.1 |
| 6,195,538 | B1 * | 2/2001 | Owaki | 455/158.4 |
| 6,266,519 | B1 * | 7/2001 | Eguchi et al. | 455/185.1 |
| 6,697,631 | B1 * | 2/2004 | Okamoto | 455/457 |
| 6,751,777 | B2 * | 6/2004 | Bates et al. | 715/501.1 |
| 6,931,451 | B1 * | 8/2005 | Logan et al. | 709/231 |
| 2001/0013012 | A1 * | 8/2001 | Hanaoka et al. | 705/14 |
| 2002/0075408 | A1 * | 6/2002 | Curreri | 348/569 |
| 2002/0194216 | A1 * | 12/2002 | Kanno et al. | 707/500.1 |

* cited by examiner

*Primary Examiner*—Edward F. Urban
*Assistant Examiner*—Nhan T. Le
(74) *Attorney, Agent, or Firm*—Lerner, David, Littenberg, Krumholz & Mentlik, LLP

(57) ABSTRACT

A receiver for receiving a digital radio broadcast in which additional information is multiplexed with audio information includes a memory for storing the additional information, a liquid crystal display (LCD), and a bookmark button. When the bookmark button is depressed during reception of a program, a control unit stores the additional information of the program in the memory as bookmark data. The bookmark data stored in the memory is displayed on the LCD. When data is specified as search data the control unit sequentially searches programs currently being broadcast or to be broadcast, and detects and tunes in to a program that includes the search data in the additional information of the program. Alternatively, the additional information of the detected program is displayed on the LCD and tuning in to the program is performed in accordance with an operation by a user.

22 Claims, 10 Drawing Sheets

| | |
|---|---|
| ITEM 1 | TIMESTAMP (TIME-OF-DAY INFORMATION) |
| ITEM 2 | SERVICE ID |
| ITEM 3 | BROADCASTING STATION NAME |
| ITEM 4 | PROGRAM NAME |
| ITEM 5 | PROGRAM CATEGORY |
| ITEM 6 | SONG TITLE |
| ITEM 7 | ARTIST NAME |
| ITEM 8 | ACCOMPANYING INFORMATION |

BM

BROADCAST RECEIVER

BACKGROUND OF THE INVENTION

1. Field of the Invention

The present invention relates to receivers. More specifically, the present invention relates to a receiver for receiving a broadcast in which additional information is multiplexed with main information including audio information (acoustic signal) or video information, such as a digital radio broadcast.

2. Description of the Related Art

Digital radio broadcasting service has already begun in Europe as DAB (Digital Audio Broadcasting) based on Eureka 147, and has been proposed in Japan and the United States.

In digital radio broadcasting, high-quality transmission of audio information such as music can be achieved, and furthermore, additional information associated with a program, such as text data and image files, can be multiplexed and broadcast with the main audio information.

The list of proposed types of additional information includes: (1) information such as ID of broadcasting service (identification information), name of broadcasting station, name of program, category of program; (2) information regarding program content, for example, an artist name and a song title in the case of a music program; (3) timestamp (time-of-day information); and (4) other accompanying information.

In the case of a music program, the accompanying information is, for example, text data showing words of a song broadcast in the program, concert information of an artist on the program, etc. It is also possible, for example, to compress the jacket of a CD including a song broadcast in the program based on JPEG (Joint Photographic Experts Group) format, broadcasting the actual data of the JPEG file and header information indicating a JPEG file as accompanying information constituting part of additional information.

In a receiver for receiving a digital radio broadcast of the type described above, additional information of a received program is displayed on a display such as an LCD (liquid crystal display). Thus, for example, a user listening to a music program is allowed to take notes regarding artist name, song title, and concert information as required with reference to the display, which is useful, for example, in purchasing CDs or concert tickets.

However, if the receiver is implemented as an on-vehicle device, the user is not allowed to watch into the display while driving, or to take notes. Furthermore, if the receiver is implemented as a portable device, in some situations, for example, while walking, the user may not be allowed to watch into the display or to take notes.

SUMMARY OF THE INVENTION

Accordingly, it is an object of the present invention to provide a receiver which allows the user to readily and correctly store desired additional information without watching the display so that the additional information can be browsed later.

Furthermore, in systems for a broadcast in which additional information is multiplexed with main information including audio information or video information, such as a digital radio broadcast, there are many which allows reception of additional information of a program currently being received and also additional information of all the other programs currently being broadcast.

Accordingly, it is another object of the present invention to provide a receiver which allows the user to readily and correctly search for and tune in to a desired program from programs currently being received other than a program currently being received, or from programs to be broadcast later, without being disturbed in listening to or viewing the program currently being received.

To these ends, the present invention, in one aspect thereof, provides a receiver including a receiving unit for receiving a broadcast in which additional information is multiplexed with main information including audio information or video information; a memory for storing the additional information; and a control unit for storing the additional information received by the receiving unit in the memory during reception of the broadcast.

The receiver preferably includes an operation unit for capturing the additional information into the memory, so that the control unit stores the additional information in the memory when the operation unit is operated and the additional information is received by the receiving unit.

Furthermore, the receiver preferably includes a display for displaying the additional information, so that the control unit displays the additional information received by the receiving unit on the display, and stores the additional information in the memory when the operation unit is operated while the additional information is in display.

The additional information includes text information which is separable on an item-by-item basis, so that the control unit stores the received additional information in the memory in an item-by-item data structure.

The control unit preferably sorts the additional information stored in the memory using a specified item of the text information as a key.

The control unit may display one set of the additional information stored in the memory on the display item by item, and sort the additional information stored in the memory using an item of the additional information selected by the user as a key before displaying the additional information on the display.

The control unit may sequentially search additional information of programs currently being broadcast using text information selected by the user from the additional information stored in the memory as search data, and detects programs which include the search data in additional information thereof.

The control unit may tune in to a program detected first.

Alternatively, if a program which includes the search data in the additional information thereof is detected, the control unit may notify the user of the detection and tune in to the program in accordance with a selecting operation by the user.

The control unit may display detected programs simultaneously on the display, so that when the user selects one of the programs displayed on the display, the control unit tunes in to the selected program.

The control unit may sequentially search the additional information of programs currently being broadcast using text information of one of the displayed items selected by the user as search data, and detect programs which include the search data in the additional information thereof.

Alternatively, the control unit may sequentially search the additional information of programs to be broadcast later using text information of an item selected by the user from the displayed items as search data, and detects programs which include the search data in the additional information thereof.

The present invention, in another aspect thereof, provides a method of program searching, including the steps of instructing data for a search to a control unit of a receiver for receiving a broadcast in which additional information is multiplexed with main information including audio information or video information; determining in the control unit whether the search data is included in the additional information of programs currently being broadcast or programs to be broadcast later; and tuning it to or notifying detection of a program if the search data is included in the additional information thereof.

According to the present invention, even while driving or walking, the user is allowed to store desired additional information as unit data so that the additional information can be browsed later, only by depressing a predetermined button or key without watching the display while listening to a program being received.

Furthermore, the user is allowed to readily and correctly search for and tune in to a desired program from programs currently being broadcast other than a program currently being received, or from programs to be broadcast later, without being disturbed in listening to or viewing the program currently being received.

DESCRIPTION OF THE PREFERRED EMBODIMENTS

Construction of Receiver

Figure 1:
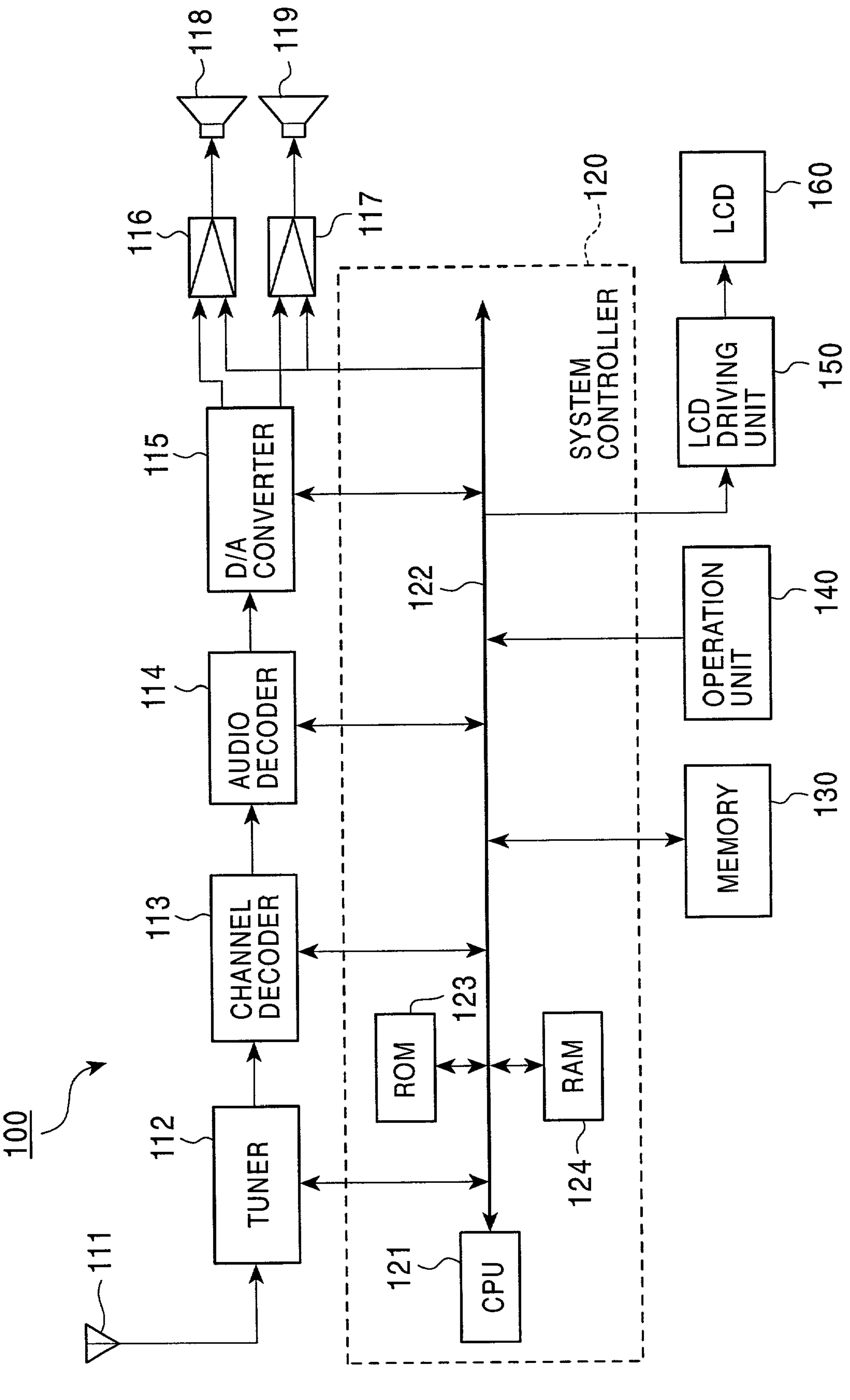
FIG. 1 is a functional block diagram of a receiver according to an embodiment of the present invention.

FIG. 1 is a block diagram of a receiver 100 according to an embodiment of the present invention, which receives a digital radio broadcast in which additional information is multiplexed with audio information.

In digital radio broadcasting, audio information is digitized by PCM (pulse code modulation), compressed, for example, based on MPEG (Moving Picture Experts Group)-1 Audio Layer-II, and channel-coded (with error correction function). Furthermore, additional information is also channel-coded. The audio information and the additional information are then multiplexed and modulated, for example, by OFDM (orthogonal frequency division multiplexing), and transmitted in the form of an RF signal.

In the receiver 100, a tuner 112 selects a broadcast signal received by an antenna 111. The signal is frequency-converted for demodulation, and then channel-decoded in a channel decoder 113. Furthermore, audio information included in the broadcast signal is expanded in an audio decoder 114 and converted into an analog signal in a D/A converter 115. The analog audio signal is amplified in audio amps 116 and 117, and then supplied to speakers 118 and 119.

The receiver 100 may be implemented, for example, as an on-vehicle device or as a portable device. In the former case, the speakers 118 and 119 will be provided on vehicles, and in the latter case, for example, headphones or earphones will be connected instead of the speakers 118 and 119.

The additional information which has been channel-decoded in the channel decoder 113 is fed to a system controller 120 of the receiver 100.

The system controller 120 includes a CPU 121, a ROM 123, and a RAM 124 connected to each other via a bus 122. The ROM 123 stores programs of an additional information storing routine, a sorting routine, a current-broadcast-search routine, a forward-search reception routine, etc. to be described later, and static data such as text fonts for displaying the additional information. The RAM 124 functions as a work area for the CPU 121.

Furthermore, a memory 130 for storing the additional information is connected to the bus 122. Alternatively, however, a portion of the RAM 124 may be used in place of the memory 130. The memory 130 is implemented with a relatively small storage capacity, and therefore, when the memory 130 becomes full, older additional information is deleted in order to accommodate new additional information.

Furthermore, an operation unit 140 having various buttons and keys, and an LCD driving unit 150 are connected to the bus 122, and an LCD 160 is connected to the LCD driving unit 150.

Figure 2:
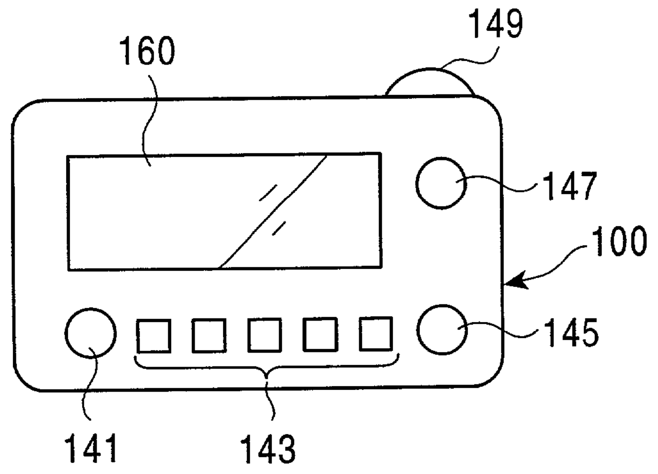
FIG. 2 is an external view of the receiver according to the embodiment.

FIG. 2 is an illustration showing an example external view of the receiver 100. In this example, the LCD 160, a power button 141, preset buttons 143, a bookmark button 145, and a display switching button 147 are provided on the front side of the receiver 100, and a jog dial 149 is provided on the top portion of the receiver 100.

The preset buttons 143 constitute operation means for making various settings of the receiver 100. The bookmark button 145 constitutes operation means for obtaining the additional information and storing the additional information in the memory 130 as bookmark data of unit data as will be described later.

The display switching button 147 constitutes operation means for switching the display on the LCD 160. The jog dial 149 allows rotating and depressing operations: by rotating it right or left (clockwise or counterclockwise), the display on the LCD 160 can be scrolled; and by depressing it in the radial direction thereof, selections and determinations can be made.

Storing and Sorting Additional Information

Storing Additional Information

Figure 3:
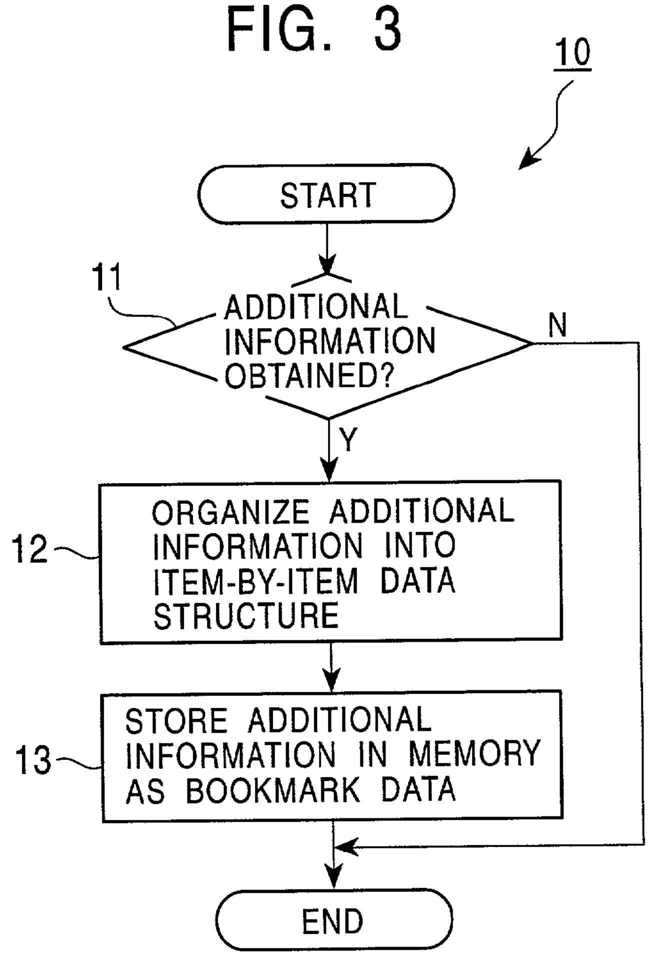
FIG. 3 is a flowchart of an example of additional information storing routine.

In the receiver 100 described above, when the user depresses the bookmark button 145 during reception of a program, the system controller 120 stores additional information of the program being received in the memory 130 as bookmark data of unit data. FIG. 3 shows an example of additional information storing routine to be executed by the CPU 121 in this case.

The CPU 121 starts the additional information storing routine 10 when the bookmark button 145 is operated during reception of a program. First, in step 11, it is determined whether additional information of the program being received has been obtained. If the additional information has been obtained, the routine proceeds to step 12, in which the additional information is organized into an item-by-item data structure. The process then proceeds to step 13, in which the additional information is stored in the memory 130 as bookmark data. If it is determined in step 11 that the additional information has not been obtained, the routine 10 is exited immediately.

The additional information consists of a data portion including actual data of information items such as timestamp, service ID, name of broadcasting station, program name, program category, song title, artist name, and accompanying information, and a header portion including codes indicating the information items.

Figures 4, 5:
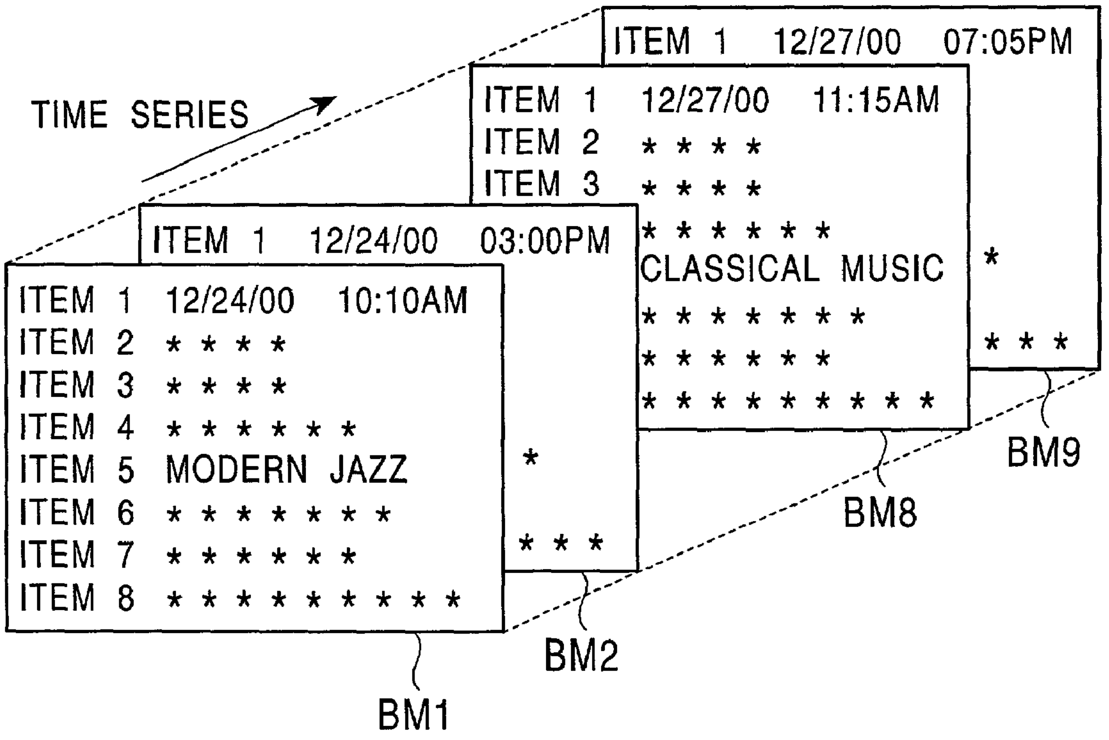
FIG. 4 is a diagram showing an example of bookmark data organized into an item-by-item data structure.
FIG. 5 is a diagram showing an example of how bookmark data is stored in a memory.

In step 12, based on the codes indicating the information items, the data structure of the additional information is organized into an array, for example, as shown in FIG. 4, with timestamp as item 1, service ID as item 2, name of broadcasting station as item 3, program name as item 4, program category as item 5, song title as item 6, artist name as item 7, and accompanying information as item 8, so that the additional information is displayed on the LCD 160 item by item. The data structure in which the actual data of the additional information is arrayed item by item will be hereinafter referred to as "bookmark data".

Accordingly, when the additional information which has been stored in the memory 130 as bookmark data BM is displayed on the LCD 160, without labeling the items as "program category", "song title", "artist name", etc., the program category, the song title, the artist name, etc. can be readily recognized.

Bookmark data BM is stored in the memory 130 in the manner described above each time the bookmark button 145 is depressed. The bookmark data BM which has been stored is managed on an item-by-item basis so that the bookmark data BM can be sorted and displayed using one of the items as a key.

FIG. 5 shows an example in which nine bookmark data BM1 to BM9 are stored in the memory 130. As shown in FIG. 5, the bookmark data is stored in time series (in this example, in the ascending order of reception timestamp in item 1), and when the memory 130 becomes full, oldest bookmark data (bookmark data BM1 in this example) is deleted and new bookmark data is stored.

The program category may be, for example, music, news, sports, weather forecast, traffic information, etc. In the case of music programs, the program category may be subdivided into "Classical Music", "Rock Music", "Modern Jazz", etc. The program category may also be similarly subdivided in the case of news, sports, weather forecast, traffic information, etc.

Sorting Additional Information

The system controller 120 sorts the bookmark data stored in the memory 130 in accordance with an operation by the user before displaying the bookmark data on the LCD 160. Before displaying the bookmark data on the LCD 160, the user operates the display switching button 147 to display a sorting menu on the LCD 160, and operates the jog dial 149 to specify an item to be used as a key for the sorting.

Figure 6:
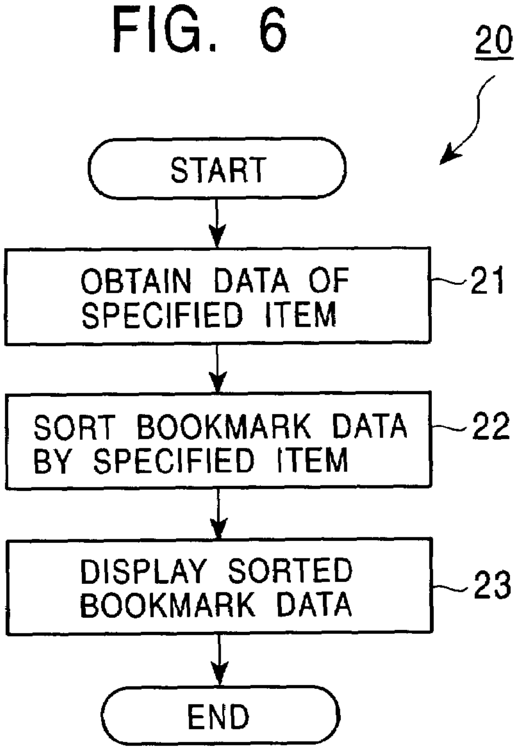
FIG. 6 is a flowchart of an example of sorting routine.

FIG. 6 shows an example of sorting routine to be executed by the CPU 121 in this case. The CPU 121 starts the sorting routine 20 when the user performs an operation to instruct a sorting by a specified key as described above. In step 21, data of the specified item is obtained from the bookmark data stored in the memory 130.

For example, if timestamp, designated as item 1 in FIG. 4, is specified as a sort key, the specific timestamp data for each of the bookmark data is obtained, and if program category, designated as item 5, is specified as a sort key, the specific program category ("Classical Music", "Rock Music", "Modern Jazz", etc.) of each of the bookmark data is obtained.

Then, the routine proceeds to step 22, in which the CPU 121 sorts the bookmark data using the specified item as a sort key. The routine then proceeds to step 23, in which the bookmark data which has been sorted is displayed on the LCD 160.

For example, if timestamp designated is specified, the bookmark data is sorted in the order of the time indicated by the timestamp being nearer to the current time, thereby being displayed with the most recent data first. If program category is specified, the bookmark data is sorted in the order of the value of the character code of the first letter of the data, such as "Classical Music", "Rock Music", "Modern Jazz", etc., being smaller, i.e., in the ascending alphabetic order.

Figure 7:
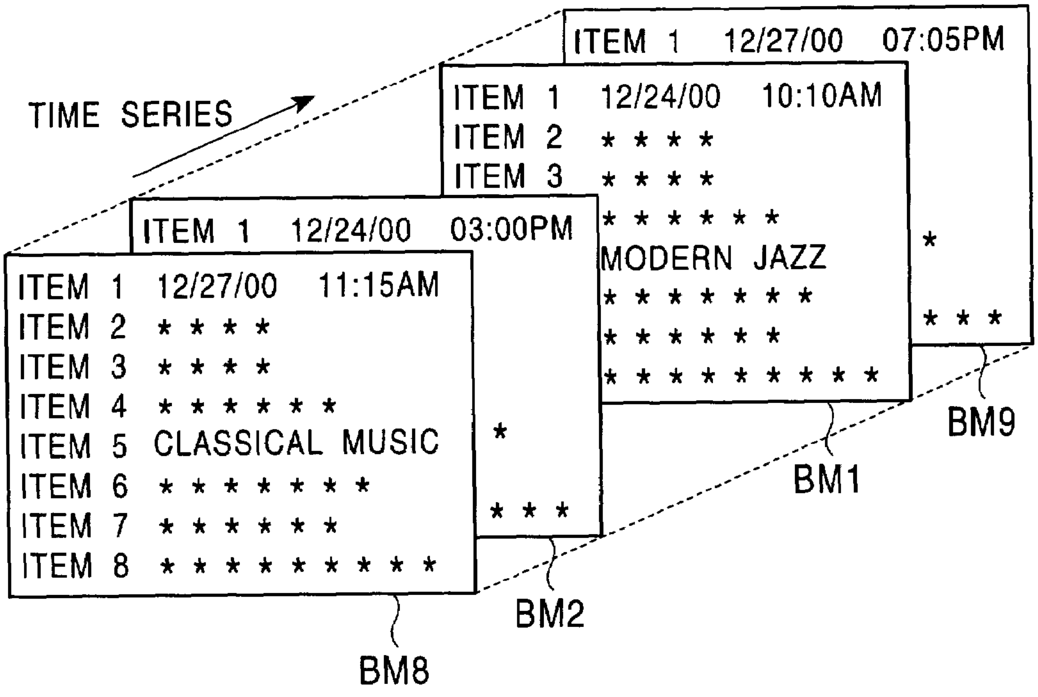
FIG. 7 is a diagram showing an example of display of bookmark data which has been sorted.

Among the alphabets from "A" to "Z", the value of the character code is smallest for the character "A", and largest for the character "Z". Thus, if program category is specified as a sort key, the bookmark data is sorted with the bookmark data BM8 with the program category of "Classical Music" preceding the bookmark data BM1 with the program category of "Modern Jazz", as shown in FIG. 7.

Because the screen of the LCD 160 is relatively small, the entire bookmark data which has been sorted may not be shown simultaneously; in which case the entire data can be viewed by switching the display using the display switching button 147 or scrolling the screen by rotating the jog dial 149.

As described above, the bookmark data is sorted using a user-specified item as a sort key, so that the user can readily browse the content of the bookmark data.

Although the arrangement is such in the embodiment that the user specifies a key for sorting, alternatively, sorting may be performed according to a predetermined item (e.g., program category designated as item 5).

Current Program Search and Forward-Search Reception

Depending on the system of digital radio broadcasting, as well as additional information of a program currently being received, additional information of other programs in broadcast can be received. When the receiver 100 receives this type of broadcast, the system controller 120 sequentially searches additional information of programs currently being broadcast or additional information of programs to be broadcast later using user-specified data as search data, and detects programs which includes the search data in the additional information thereof.

Accordingly, the user is allowed to readily detect a desired program, for example, a program in the category of "Modern Jazz", without being disturbed in listening to the program currently being received, and also to tune in to the desired program instead of the program currently being received.

Figure 8A:
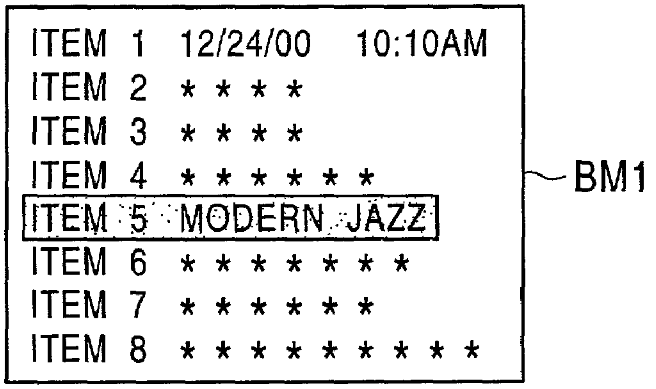
FIGS. 8A to 8C are diagrams showing an example of display for current broadcast search and forward-search reception.
Figure 8B:
Figure 8C:
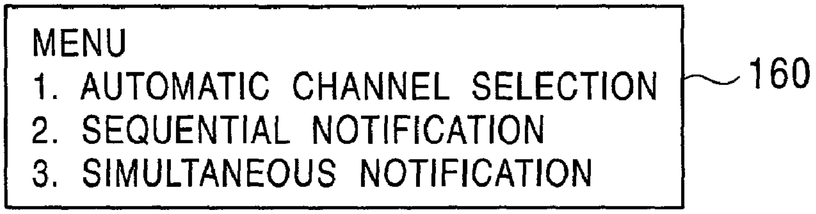

In this case, the user first specifies an item as a sort key and instructs a sorting operation, so that the bookmark data is sorted and displayed on the LCD 160 as shown in FIG. 7. Then, as shown in FIG. 8A, the user selects, for example, "Modern Jazz" in the bookmark data BM1 to specify "Modern Jazz" as search data. Then, the user switches the display of the LCD 160 to a menu screen as shown in FIG. 8B, and selects either "current broadcast search" or "forward-search reception". When the user selects "current program search", the user further selects one of "automatic channel selection", "sequential notification", and "simultaneous notification" in a menu screen as shown in FIG. 8C. When the user selects "forward-search reception", the user further selects either "automatic channel selection" or "sequential notification" in a menu screen as shown in FIG. 8B or a menu screen not shown.

Accordingly, the CPU 121 executes a search within programs currently being broadcast or a forward-search including programs to be broadcast later according to the routine described below.

However, even if the user specifies "Modern Jazz" as search data, some broadcast stations may describe the program category in the additional information as "MODERN JAZZ", "Jazz" or "JAZZ".

Accordingly, software for the routine is implemented so that the CPU 121 determines that the search data is included in the additional information if the additional information differs from the search data only within the variations as described above. For example, a step for temporarily converting character data of both additional information and search data into uppercase letters may be provided immediately before the step of determining whether the additional information and the search data match.

Furthermore, search data may be specified using a plurality of information items with logic OR or logic AND. For example, the user may specify the logic OR of a specific artist name and a specific song title as search data, in which case the routine to be described later searches for programs which includes at least one of the artist name and the song title in the additional information thereof. Alternatively, the user may specify the logic AND of a specific artist name and a specific song title as search data, in which case the routine to be described later searches for programs which includes both the artist name and the song title in the additional information thereof.

The search range is not limited to the information item from which the search data is selected. For example, if "Modern Jazz" is selected as search data from program category designated as item 5 as described above, if "Modern Jazz" is included in other items of additional information of a program, the program is selected or notified.

Automatic Channel Selection by Current Broadcast Search

Figure 9:
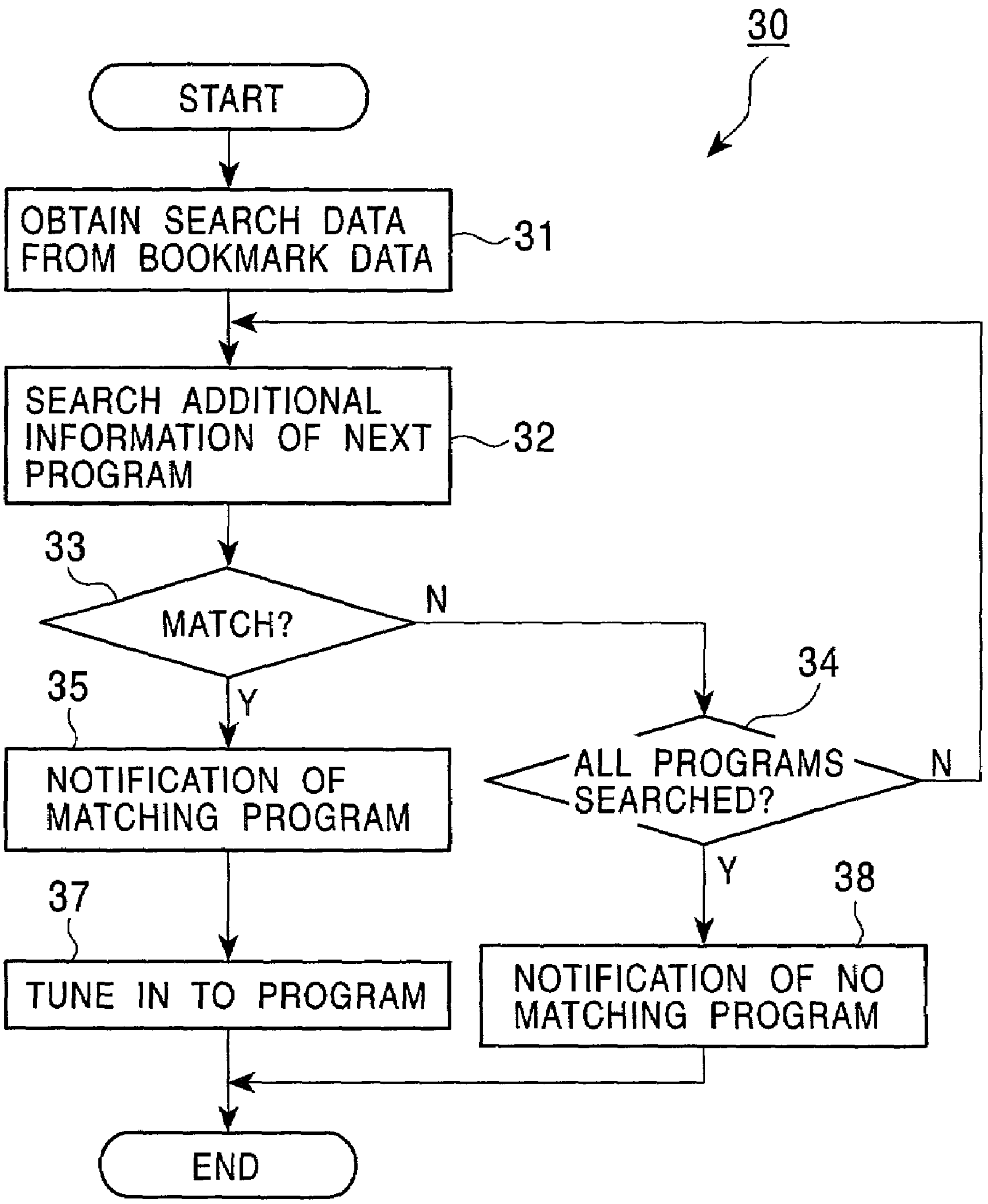
FIG. 9 is a flowchart of an example of current-broadcast-search automatic channel selection routine.

FIG. 9 shows an example of a routine to be executed by the CPU 121 when "automatic channel selection" under "current broadcast search" is selected.

The CPU 121 starts the current-broadcast-search automatic channel selection routine 30 when the user performs an operation to select the routine. In step 31, search data is obtained from the bookmark data stored in the memory 130, in the manner described above with reference to FIGS. 8A to 8C. The routine then proceeds to step 32, in which additional information of a next program currently being broadcast is searched. The routine then proceeds to step 33, in which it is determined whether the additional information matches the search data (whether the search data is included in the additional information). If no match is found, the routine proceeds to step 34, in which it is determined whether all the programs currently being broadcast have been searched. If any program is remaining, the routine returns to step 32, in which additional information of a next program is searched.

If it is determined in step 33 that the additional information matches the search data, the routine proceeds to step 35, in which the user is notified on the LCD 160 that a matching program (a program which includes the search data in the additional information thereof) has been found. The routine then proceeds to step 37, tuning in to the program, and the current-broadcast-search automatic channel selection routine is exited.

If it is determined in step 34 that all the programs have been searched, the routine proceeds to step 38, in which the user is notified that no matching program has been found among the programs currently being broadcast, and the current-broadcast-search automatic channel selection routine is exited.

According to this example, the user only has to specify portion of bookmark data as search data and to select "automatic channel selection" under "current broadcast search" from the menu, so that desired programs among all the programs currently being broadcast, for example, programs in the category of "Modern Jazz", can be received without being disturbed in listening to the program currently being received during the search.

Sequential Notification by Current Broadcast Search

Figure 10:
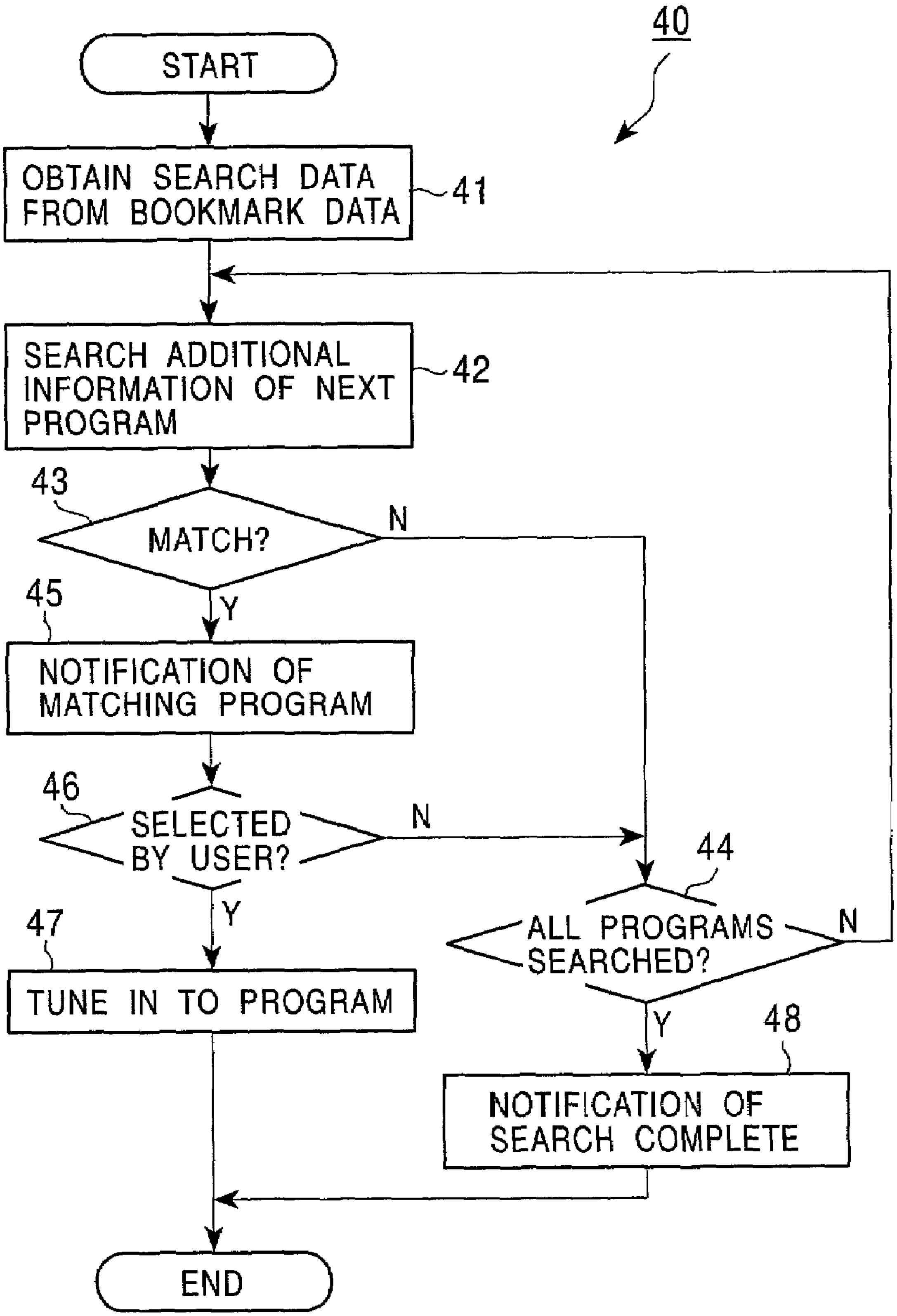
FIG. 10 is a flowchart of an example of current-broadcast-search sequential notification routine.

FIG. 10 shows an example of a routine to be executed by the CPU 121 when "sequential notification" under "current broadcast search" is selected.

The CPU 121 starts the current-broadcast-search sequential notification routine 40 when the user performs an operation to select the routine. In step 41, search data is obtained from the bookmark data, similarly to step 31 in FIG. 9. The routine then proceeds to step 42, in which additional information of a program currently being broadcast is searched. The routine then proceeds to step 43, in which it is determined whether the additional information matches the search data. If no match is found, the routine proceeds to step 44, in which it is determined whether all the programs currently being broadcast have been searched. If any program remains, the routine returns to step 42, in which additional information of a next program is searched.

If it is determined in step 43 that the additional information matches the search data, the routine proceeds to step 45, in which the user is notified that a matching program has been found and the additional information of the program is displayed on the LCD 160.

The user determines whether or not to select the program based on the artist name, song title, etc. on the display, and if the user wishes to select the program, the user depresses the jog dial 149.

After the user notification in step 45, the routine proceeds to step 46, in which the CPU 121 determines whether or not the user has selected the program. If the program has not been selected, the routine returns to step 44, in which it is determined whether all the programs have been searched. If any program remains, the routine returns to step 42, in which additional information of a next program is searched.

If it is determined in step 46 that the user has selected the program, the routine proceeds to step 47, tuning in to the program, and the current-broadcast-search sequential notification routine is exited. If it is determined in step 44 that all the programs have been searched, the user is notified that the search is complete, and the current-broadcast-search sequential notification routine is exited.

According to this example, instead of automatically tuning in to a program detected first as in the example shown in FIG. 9, the user is allowed to determine whether or not to tune in to the program. Thus, the user is allowed to readily receive desired programs without being disturbed in listening to the program currently being received during the search.

Simultaneous Notification by Current Broadcast Search

Figure 11:
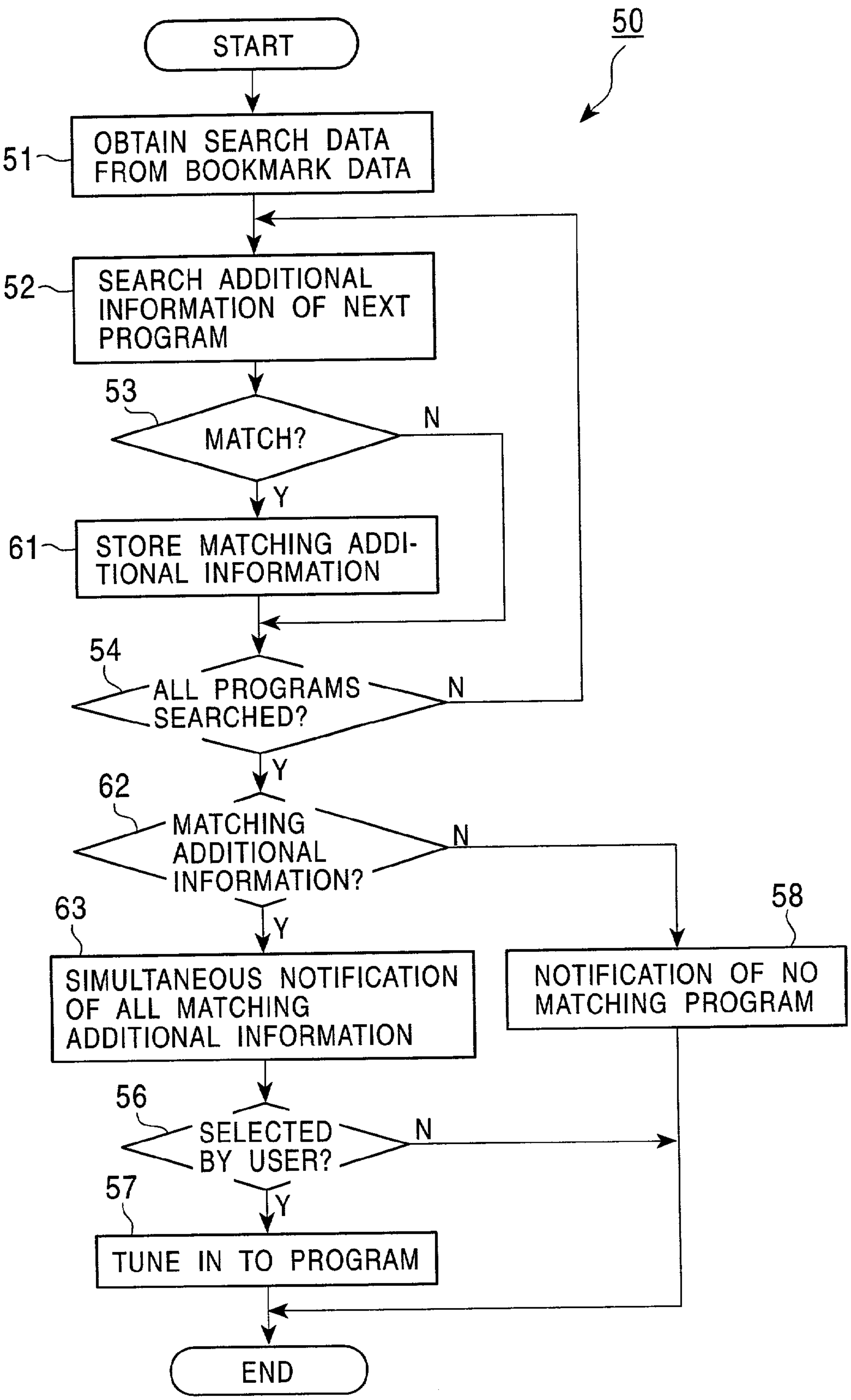
FIG. 11 is a flowchart of an example of current-broadcast-search simultaneous notification routine.

FIG. 11 shows an example of a routine to be executed by the CPU 121 when "simultaneous notification" under "current broadcast search" is selected.

The CPU 121 starts the current-broadcast-search simultaneous notification routine 50 when the user performs an operation to select the routine. In step 51, search data is obtained from the bookmark data, similarly to steps 31 and 41 described above. The routine proceeds to step 52, in which additional information of a program currently being broadcast is searched. The routine then proceeds to step 53, in which it is determined whether the additional information matches the search data.

If the additional information matches the search data, the routine proceeds from step 53 to step 61, in which the additional information is stored in the RAM 124, and the routine then proceeds to step 54. If the additional information does not match the search data, the routine directly proceeds from step 53 to step 54.

In step 54, it is determined whether all the programs currently being broadcast have been searched. If any program remains, the routine returns to step 52, in which additional information of a next program is searched.

If it is determined in step 54 that all the programs have been searched, the routine proceeds to step 62, in which it is determined whether the additional information matching the search data is stored in the RAM 124. If the additional information is stored in the RAM 124, the routine proceeds to step 63, in which all the additional information matching the search data is displayed simultaneously on the LCD 160 for the user.

The user selects one of the programs on the display, or does not select any program if no desired program is included.

After the user notification in step 63, the routine proceeds to step 56, in which the CPU 121 determines whether the user has selected any program. If any program has been selected, the routine proceeds to step 57, tuning in to the program selected by the user, and the current-broadcast-search simultaneous notification routine is exited. If no program has been selected, the current-broadcast-search simultaneous notification routine is exited immediately.

If it is determined in step 62 that the additional information matching the search data is not stored in the RAM 124, that is, if no additional information matching the search data has been found, the routine proceeds to step 58, in which the user is notified that no program matching program has been found among the programs currently being broadcast, and the current-broadcast-search simultaneous notification routine is exited.

According to this example, if one or more programs desired by the user, for example, programs in the category of "Modern Jazz", are being broadcast, the user is allowed to select and receive the most desired program. Also in this case, the user is not disturbed in listening to the program currently being received during the search.

Automatic Channel Selection by Forward-Search Reception

Figure 12:
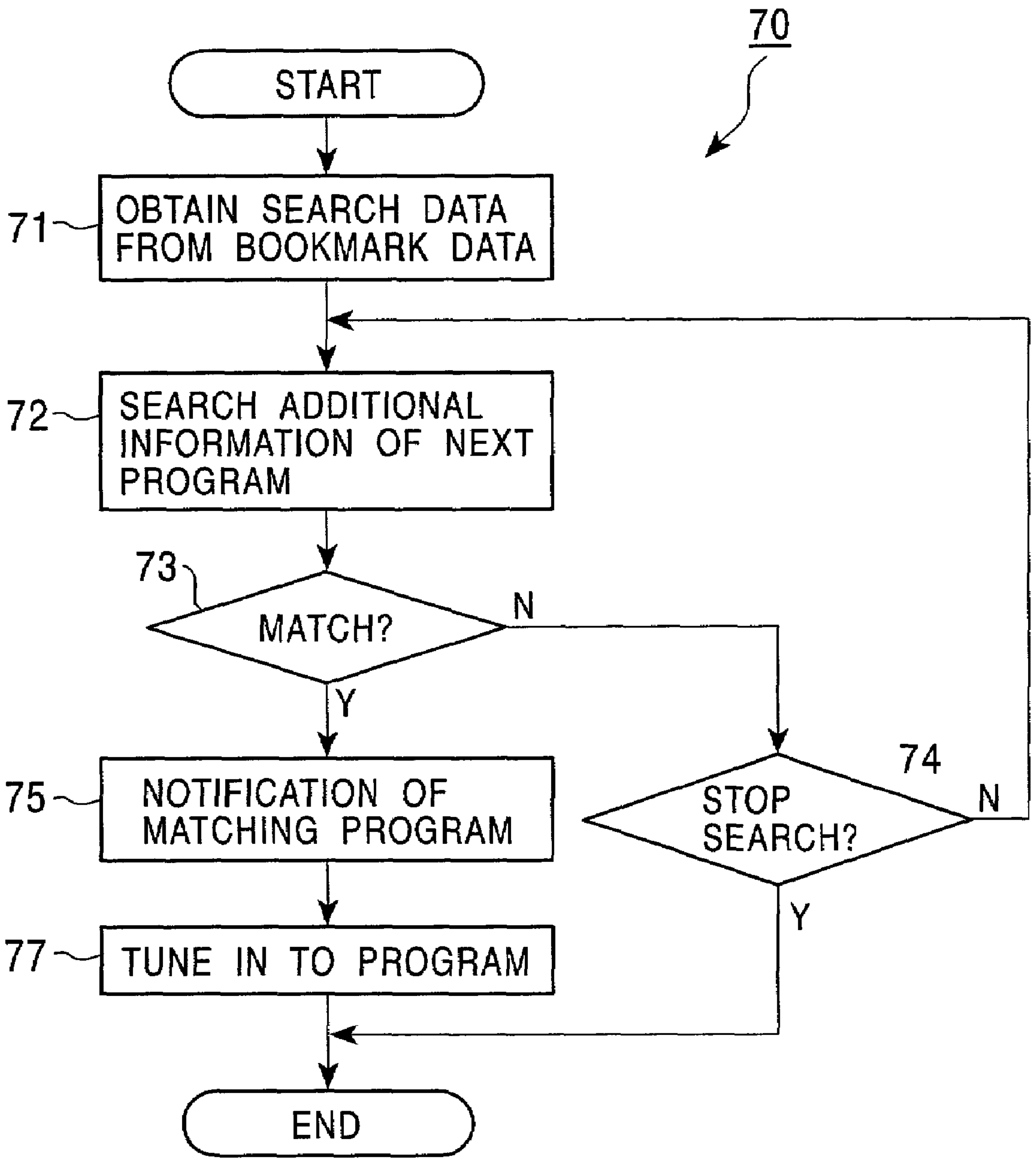
FIG. 12 is a flowchart of an example of forward-search-reception automatic channel selection routine.

FIG. 12 is shows an example of a routine to be executed by the CPU 121 when "automatic channel selection" under "forward-search reception" is selected.

The CPU 121 starts the forward-search-reception automatic channel selection routine 70 when the user performs an operation to select the routine. In step 71, search data is obtained from the bookmark data, similarly to step 31 described earlier. The routine then proceeds to step 72, in which additional information of a next program to be broadcast later is searched. The routine then proceeds to step 73, in which it is determined whether the additional information matches the search data. If no match is found, the routine proceeds to step 74, in which it is determined whether or not to stop the search. If the user has not instructed to stop the search as will be described later, the routine returns to step 72, in which additional information of a next program is searched.

If it is determined in step 73 that the additional information matches the search data, the routine proceeds to step 75, in which the user is notified that a matching program has been found. The routine then proceeds to step 77, tuning in to the program, and the forward-search-reception automatic channel selection routine is exited.

If it is determined in step 74 that the search be stopped due to a user instruction to stop the search, the forward-search-reception automatic channel selection routine is exited immediately.

The user is allowed to instruct to stop the search at any time during the search, by operating the display switching button 147 to display a menu for stopping the search on the LCD 160 and operating the jog dial 149.

That is, the routine differs from the current-broadcast-search automatic channel selection routine shown in FIG. 9 in that the routine keeps running until an instruction to stop the search is issued.

According to this example, the user only has to specify portion of bookmark data as search data and to select "automatic channel selection" under "forward search reception", so that desired programs among all the programs to be broadcast later, for example, programs in the category of "Modern Jazz", can be received without being disturbed in listening to the program currently being received.

Sequential Notification by Forward-Search Reception

Figure 13:
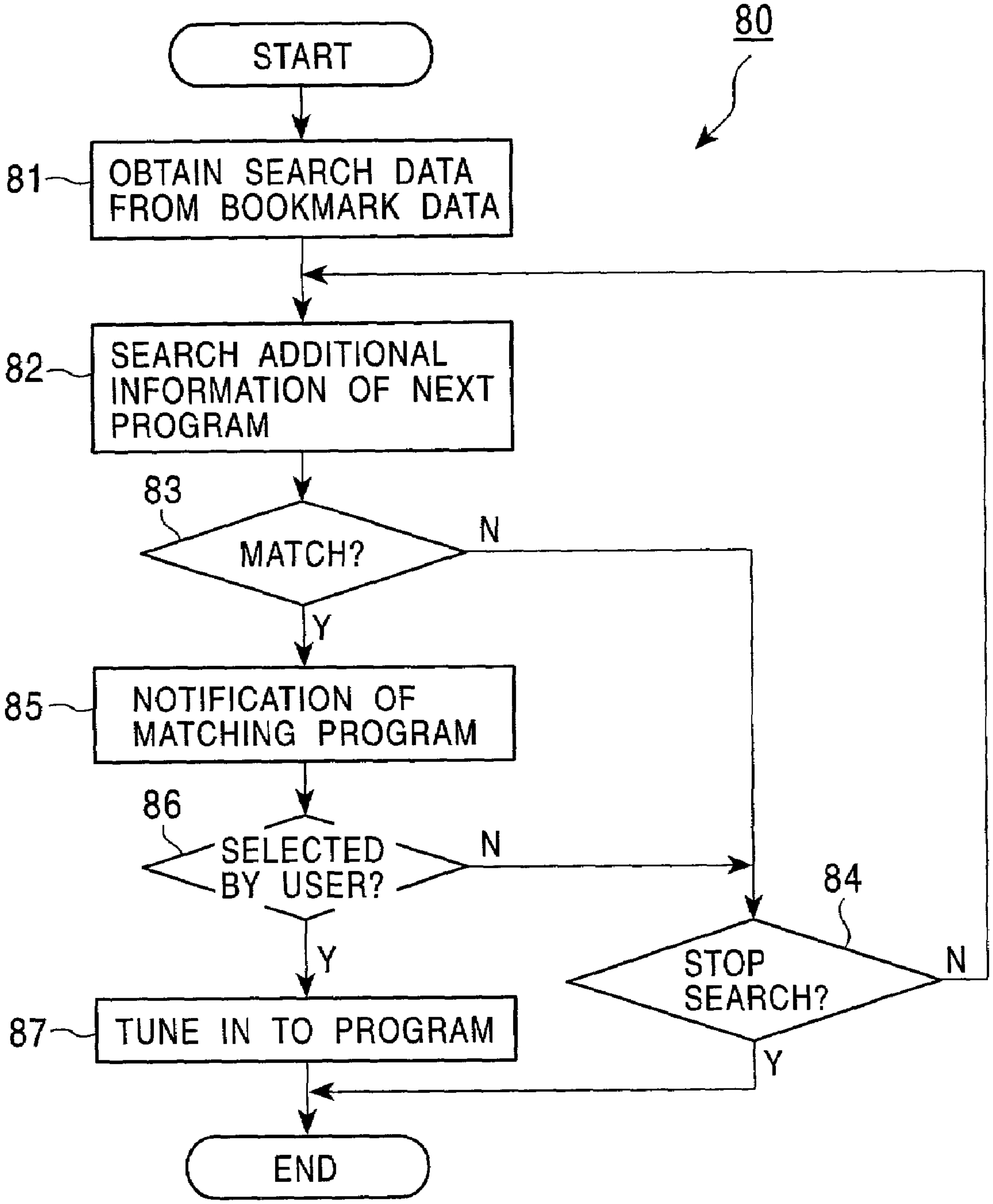
FIG. 13 is a flowchart of an example of forward-search-reception sequential notification routine.

FIG. 13 shows an example of a routine to be executed by the CPU 121 when "sequential notification" under "forward-search reception" is selected.

The CPU 121 starts the forward-search-reception sequential notification routine 80 when the user performs an operation to select the routine. In step 81, search data is obtained from the bookmark data. The routine then proceeds to step 82, in which additional information of a next program to be broadcast later is searched. The routine then proceeds to step 83, in which it is determined whether the additional information matches the search data. If no match is found, the routine proceeds to step 84, in which it is determined whether or not to stop the search. If the user has not instructed to stop the search, the routine returns to step 82, in which additional information of a next program is searched.

If it is determined in step 83 that the additional information matches the search data, the routine proceeds to step 85, in which the user is notified that a matching program has been found and the additional information of the program is displayed on the LCD 160.

The user determines whether or not to select the program based on the song title, artist name, etc. on the display, and if the user wishes to select the program, the user depresses the jog dial 149.

After the user notification in step 85, the routine proceeds to step 86, in which the CPU 121 determines whether the user has selected the program. If the program has not been selected, the routine proceeds to step 84, in which it is determined whether or not to stop the search. If the user has not instructed to stop the search, the routine returns to step 82, in which additional information of a next program is searched.

If it is determined in step 86 that the user has selected the program, the routine proceeds to step 87, tuning in to the program, and the forward-search-reception sequential notification routine is exited. If it is determined in step 84 that the search be stopped, the forward-search-reception sequential notification routine is exited immediately.

According to this example, instead of automatically tuning in to a program detected first as in the example shown in FIG. 12, the user is allowed to determine whether or not to tune in to the program. Thus, the user is allowed to readily receive desired programs without being disturbed in listening to the program currently being received during the search.

Other Embodiments

The specific arrangement of the operation unit 140 is not limited to the example shown in FIG. 2, and may be altered as required.

Furthermore, although the embodiment has been described in the context of receiving a digital radio broadcast in which additional information is multiplexed with audio information, without limitation to digital radio broadcasting, the present invention may be generally applied to cases where a broadcast in which additional information is multiplexed with audio information or video information, such as a digital television broadcast in which additional information is multiplexed with video (and audio) information.

What is claimed is:

1. A receiver, comprising:

a receiving unit for receiving a broadcast in which additional information is multiplexed with main program information including one of audio information and video information;

a memory;

a control unit for storing and managing the additional information received by the receiving unit in the memory as bookmarked data during the current reception of the broadcast, the bookmarked data being organized as individual data sets that each include at least a program name, song title and artist name associated with the broadcast and additional information; and operation means for specifying search data from among the additional information stored in the memory, and wherein the control unit sequentially searches the additional information of additional programs being broadcast using the search data and causes the receiving unit to select a one of the additional programs being broadcast when the additional information associated with the additional program includes the search data.

2. The receiver according to claim 1, further comprising:

a display for displaying the additional information; and operation means for capturing the additional information into the memory, wherein the control unit displays the additional information received by the receiving unit on the display and causes the additional information to be stored in the memory when the operation means is operated during a time the additional information is being displayed on the display.

3. The receiver according to claim 1, wherein the additional information includes text information that is separable on an item-by-item basis.

4. The receiver according to claim 3, wherein the control unit sorts the organized additional information stored in the memory using a specified item of the text information as a key for sorting.

5. The receiver according to claim 3, further comprising a display for displaying additional information, wherein the control unit sorts the organized additional information using a specified item of the text information as a key for sorting before displaying the additional information on the display.

6. The receiver according to claim 5, wherein said control unit displays one set of the additional information stored in the memory on the display item by item and sorts the organized additional information stored in the memory using an item of the additional information selected by a user as the key before displaying the additional information on the display.

7. The receiver according to claim 1, wherein the control unit sequentially searches additional information of programs currently being broadcast using text information selected by a user from the additional information stored in the memory as search data and detects a program that includes the search data in additional information of the detected program.

8. The receiver according to claim 7, wherein the control unit tunes in to the program that includes the search data that is detected first.

9. The receiver according to claim 7, wherein when the program that includes the search data in the additional information is detected the control unit notifies the user of the detection and tunes in to the detected program in accordance with a selecting operation by the user.

10. The receiver according to claim 7, further comprising a display for displaying the detected program, wherein the control unit displays the detected program simultaneously on the display and when the user selects the displayed program the control unit tunes to the selected program.

11. The receiver according to claim 1, further comprising a display for displaying the additional information, wherein the additional information includes text information that is separable on an item-by-item basis, and the control unit: displays one set of the additional information stored in the memory on the display item by item; sequentially searches the additional information of programs currently being broadcast using text information of one of the displayed items selected by a user as search data; and detects a program that includes the search data in the additional information of the detected program.

12. The receiver according to claim 11, wherein the control unit tunes in to the program that includes the search data that is detected first.

13. The receiver according to claim 11, wherein if a program that includes the search data in the additional information is detected the control unit displays the additional information on the display and tunes in to the detected program in accordance with a selecting operation by the user.

14. The receiver according to claim 11, wherein the control unit displays the detected programs simultaneously on the display and when one of the displayed programs is selected by the user the control unit tunes in to the selected program.

15. The receiver according to claim 1, wherein the control unit sequentially searches the additional information of programs to be broadcast using text information selected by a user from the additional information stored in the memory as search data and detects a program that includes the search data in the additional information of the detected program.

16. The receiver according to claim 15, wherein the control unit tunes in to the program that includes the search data that is detected first.

17. The receiver according to claim 15, wherein when the program that includes the search data in the additional information is detected the control unit notifies the user of the detection and tunes in to the program in accordance with a selecting operation by the user.

18. The receiver according to claim 1, further comprising a display for displaying the additional information, wherein: the additional information includes text information that is separable on an item-by-item basis; and the control unit displays one set of the additional information stored in the memory on said display item by item, sequentially searches the additional information of programs to be broadcast using text information of an item selected by a user from displayed items as search data, and detects a program that includes the search data in the additional information of the detected program.

19. The receiver according to claim 18, wherein the control unit tunes in to the program that includes the search data that is detected first.

20. The receiver according to claim 18, wherein when the program that includes the search data in the additional information is detected the control unit displays the additional information on the display and tunes in to the program in accordance with a selecting operation by the user.

21. A method of program searching, comprising the steps of:

instructing data for a search to a control unit of a receiver for receiving a broadcast in which additional information is multiplexed with main information including one of audio information and video information;

determining in the control unit whether the search data is included in one of the additional information of programs currently being broadcast and programs to be broadcast; and storing the additional information on an item-by-item basis as bookmarked data during a current reception of the broadcast, the bookmarked data being organized as individual data sets that each include at least a program name, song title and artist name associated with the broadcast and additional information; and tuning to and notifying of detection of a program being broadcast, so that a user may perceive it during its broadcast, when the search data is included in the additional information of the program.

22. The method according to claim 21, wherein the additional information includes text information that is separable on an item-by-item basis and text information of an item selected by a user from the additional information displayed item by item is instructed to the control unit as the search data.

* * * * *